US010409846B2

(12) United States Patent
Schilder et al.

(10) Patent No.: US 10,409,846 B2
(45) Date of Patent: Sep. 10, 2019

(54) SYSTEMS AND METHODS FOR NATURAL LANGUAGE QUESTION ANSWERING AND ANALYSIS

(71) Applicants: Frank Schilder, Eagan, MN (US); Charese Smiley, Eagan, MN (US); Dezhao Song, Eagan, MN (US); Christopher Hardie Brew, London (GB)

(72) Inventors: Frank Schilder, Eagan, MN (US); Charese Smiley, Eagan, MN (US); Dezhao Song, Eagan, MN (US); Christopher Hardie Brew, London (GB)

(73) Assignee: THOMSON REUTERS GLOBAL RESOURCES UNLIMITED COMPANY (CH)

( * ) Notice: Subject to any disclaimer, the term of this patent is extended or adjusted under 35 U.S.C. 154(b) by 282 days.

(21) Appl. No.: 15/044,188

(22) Filed: Feb. 16, 2016

(65) Prior Publication Data
US 2016/0239562 A1 Aug. 18, 2016

Related U.S. Application Data

(60) Provisional application No. 62/115,666, filed on Feb. 13, 2015.

(51) Int. Cl.
*G06F 17/30* (2006.01)
*G06F 16/33* (2019.01)
(Continued)

(52) U.S. Cl.
CPC ........ *G06F 16/3344* (2019.01); *G06F 16/338* (2019.01); *G06F 16/3329* (2019.01); *G06F 17/2705* (2013.01); *G06F 17/277* (2013.01)

(58) Field of Classification Search
USPC ............... 707/609, 687, 709, 750, 813, 821
See application file for complete search history.

(56) References Cited

U.S. PATENT DOCUMENTS

| 5,924,089 A | 7/1999 | Mocek et al. |
| 6,999,930 B1 * | 2/2006 | Roberts ................. G10L 15/193 |
| | | 379/88.01 |

(Continued)

FOREIGN PATENT DOCUMENTS

WO 2016/131045 A1 8/2016

OTHER PUBLICATIONS

International Search Report and Written Opinion issued in corresponding PCT Application No. PCT/US2016/017993, dated Apr. 22, 2016, 7 pages.

(Continued)

*Primary Examiner* — Sana A Al-Hashemi
(74) *Attorney, Agent, or Firm* — Thomson Reuters

(57) ABSTRACT

The present invention is directed towards systems and methods for querying a data repository using a flexible natural language interface, which comprises receiving an initiated user question at a graphical user interface and generating automatically one or more suggested completed questions in response to the receipt of the initiated user question. A selected completed question at the graphical user interface is received and subsequently parsed into a logic representation. The logic representation is translated into an executable query, which is executed against the data repository. One or more search results in response to the executed translated query and presented at the graphical user interface. The present invention further comprises generating one or more analytic results corresponding to the one or more search responsive to the translated query.

12 Claims, 12 Drawing Sheets

(51) Int. Cl.
*G06F 17/27* (2006.01)
*G06F 16/338* (2019.01)
*G06F 16/332* (2019.01)

(56) References Cited

U.S. PATENT DOCUMENTS

| | | |
|---|---|---|
| 7,027,975 B1 | 4/2006 | Pazandak et al. |
| 7,702,639 B2 | 4/2010 | Stanley et al. |
| 2007/0100604 A1 | 5/2007 | Calcagno et al. |
| 2007/0156669 A1* | 7/2007 | Marchisio ............. G06F 16/951 |
| 2008/0320031 A1 | 12/2008 | Denoual |
| 2011/0258049 A1* | 10/2011 | Ramer ................... G06Q 30/02 |
| | | 705/14.66 |
| 2012/0173502 A1* | 7/2012 | Kumar .............. G06F 17/30038 |
| | | 707/706 |
| 2012/0254143 A1 | 10/2012 | Varma et al. |
| 2013/0262501 A1* | 10/2013 | Kuchmann-Beauger .................... |
| | | G06F 17/30958 |
| | | 707/769 |
| 2014/0163955 A1 | 6/2014 | Ng Tari et al. |
| 2014/0164389 A1 | 6/2014 | Hampapur et al. |
| 2014/0249804 A1* | 9/2014 | Jackson ................. G06F 17/28 |
| | | 704/9 |
| 2014/0279837 A1* | 9/2014 | Guo .................. G06F 17/30589 |
| | | 707/603 |
| 2017/0140405 A1* | 5/2017 | Gottemukkala ... G06Q 30/0206 |

OTHER PUBLICATIONS

International Preliminary Report on Patentability issued in corresponding PCT Application No. PCT/US2016/017993, dated Aug. 24, 2017, 7 pages.

* cited by examiner

FIG. 5B

Start a query here to generate analytics and result sets for further analysis.

show me all drugs

FIG. 5C

Start a query here to generate analytics and result sets for further analysis.

show me all drugs
developed by
having an indication of
in
that have already been launched

FIG. 5D

Start a query here to generate analytics and result sets for further analysis.

show me all drugs having an indication of [ ]

Ebola
Hypertension
cancer
pain

SYSTEMS AND METHODS FOR NATURAL LANGUAGE QUESTION ANSWERING AND ANALYSIS

RELATED APPLICATION

This application claims priority to U.S. Provisional Application 62/115,666 filed on Feb. 13, 2015, the contents of which are all incorporated herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2016 Thomson Reuters.

TECHNICAL FIELD

This disclosure relates generally to the database querying. More specifically, the disclosure is directed towards systems and methods for providing a flexible natural language interface, with the support of auto-suggest, to query knowledge bases in order to return search results and corresponding analytics.

BACKGROUND

Many professionals, such as physicians, life science researchers, financial analysts and patent examiners, rely on knowledge bases as significant sources of information that are required in order to perform their daily duties effectively. In order to effectively retrieve data from a knowledge base, typical users often face the challenge of having to learn specific query languages (e.g., SQL, a query language used to retrieve information from relational databases, and SPARQL, a query language used to search a triple store). However, the rapid changes in query languages (e.g., Relational Databases, Triple stores, NoSQL databases, etc.) makes it extremely difficult for these professional and non-technical users to always keep up with the development of these latest query languages.

This situation prevents users from effectively utilizing the available information in a knowledge base. Therefore, it is important to design user-friendly interfaces that bridge the gap between non-technical users and the fast development of querying techniques, and provide intuitive approaches for querying the knowledge base.

SUMMARY

The present invention is directed towards systems and methods for querying a data repository using a flexible natural language interface. In one aspect, the method includes receiving an initiated user question at a graphical user interface and generating automatically one or more suggestions in order to build complete questions in response to the receipt of the initiated user question. A selected completed question at the graphical user interface is received and subsequently parsed into a logic representation. The logic representation is translated into an executable query, which is executed against the data repository. By first parsing a question into a logic representation and subsequently translating it into a query of a specific query language, flexibility is maintained thus enabling adoption of new query languages, as well as the ability to select from a wider range of query language technology as is most appropriate for a given use case.

Search results are generated in response to the executed translated query, and are presented at the graphical user interface. The present invention further comprises generating one or more analytic results corresponding to the search results in response to the translated query. According to one embodiment, the one or more analytic results comprises one or more of a descriptive analytic result, a comparative analytic result, a temporal analytic result and a content-based analytic result.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

FIGS. 5A-5D) are screen diagrams of the exemplary flexible natural language interface:

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
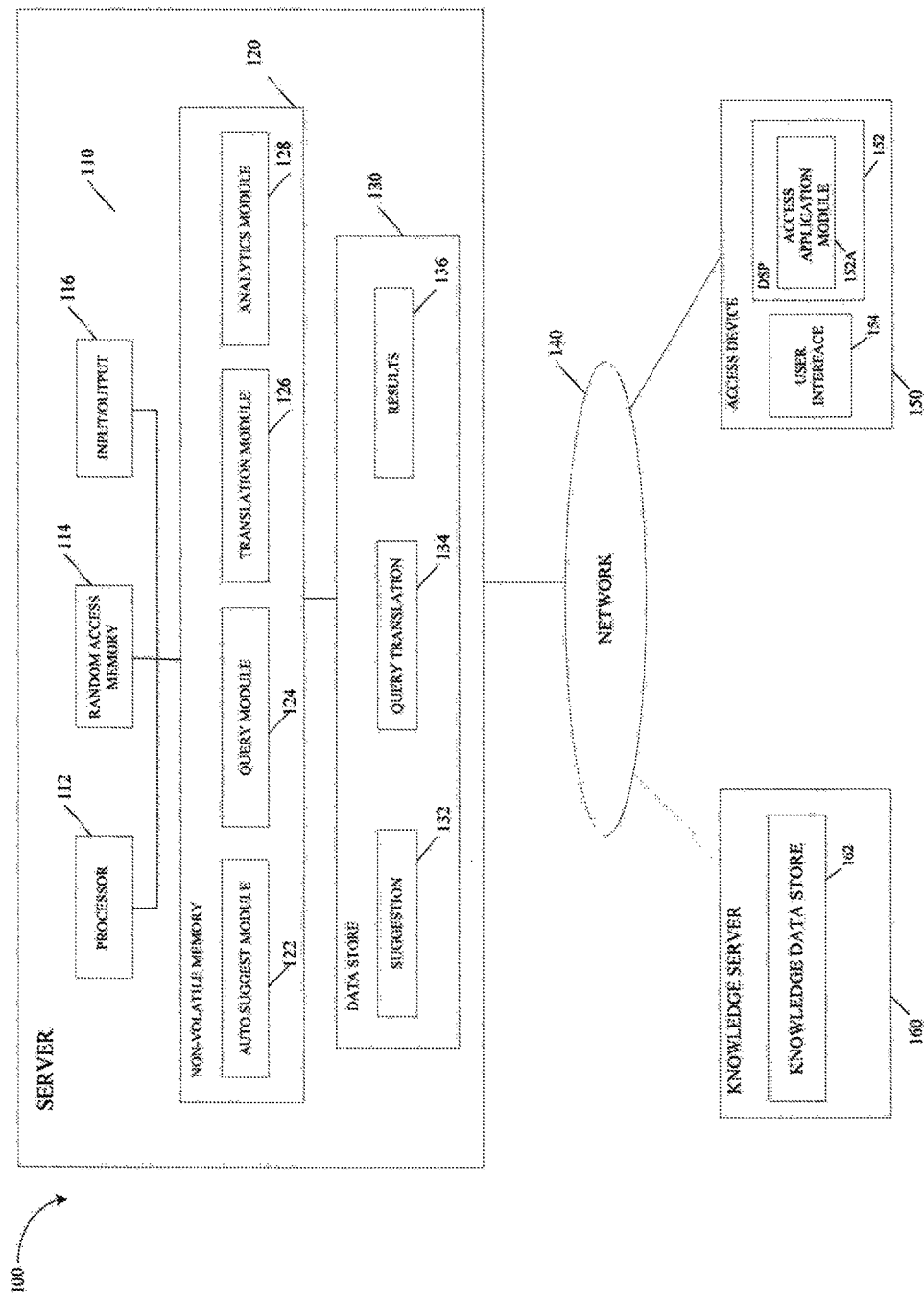
FIG. 1 is a schematic depicting an exemplary computer-based system for querying a knowledge base using a flexible natural language interface.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instructions known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media.

In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and a data store 130, all of which are interconnected via a common bus and controlled by the processor 112.

As shown in the FIG. 1 example, in one embodiment, the non-volatile memory 120 is configured to include an auto suggest module 122, a query module 124, a translation module 126 and an analytics module 128. The auto suggest module 122 is utilized to automatically suggest question components or segments, e.g. suggested words or phrases, on an iterative basis in response to a user initiated user question. The query module 124 serves to receive the questions from the access device 150, signal the auto suggest module 122 and the translation module 126 to perform their respective functions, to execute the translated query against the knowledge data store 126 and to return the search results from the knowledge data 162 responsive to the translated query. The translation module 126 serves to parse the user question into a logic representation and then translate the logic representation to a query in a specific executable query language such as SQL or SPARQL. The analytics module 128 serves to perform the appropriate analytics corresponding to the search results. Additional details of modules 122 through 128 are discussed in connection with FIGS. 2-11.

As shown in FIG. 1, in one embodiment, a network 140 is provided that can include various devices such as routers, server, and switching elements connected in an Intranet, Extranet or Internet configuration. In one embodiment, the network 140 uses wired communications to transfer information between an access device 150, the server device 110, the data store 130 and a knowledge server 160. In another embodiment, the network 140 employs wireless communication protocols to transfer information between the access device 150, the server device 110, the data store 130 and the knowledge server 160. For example, the network 140 may be a cellular or mobile network employing digital cellular standards including but not limited to the 3GPP, 3GPP2 and AMPS family of standards such as Global System for Mobile Communications (GSM), General Packet Radio Service (GPRS). CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 140 may also be a Wide Area Network (WAN), such as the Internet, which employs one or more transmission protocols, e.g. TCP/IP. As another example, the network 140 may employ a combination of digital cellular standards and transmission protocols. In yet other embodiments, the network 140 may employ a combination of wired and wireless technologies to transfer information between the access device 150, the server device 110, the data store 130 and the knowledge server 160.

The data store 130 is a repository that maintains and stores information utilized by the before-mentioned modules 122 through 128. In one embodiment, the data store 130 is a relational database. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes a suggestion data store 132, a query translation data store 134 and a results data store 136. The suggestion data store 132 maintains a defined grammar and the linguistic constraints encoded in the grammar used to generate suggested query components. The query translation data store 134 serves to store and maintain the logic data and constraints, as well as the logic representation and parse tree. The results data store 136 serves to maintain all algorithms used to generate analytics on the search results as well as the generated analytics itself.

Although the data store 130 shown in FIG. 1 is connected to the network 140, it will be appreciated by one skilled in the art that the data store 130 and/or any of the information shown therein, can be distributed across various servers and be accessible to the server 110 over the network 140; be coupled directly to the server 110; be configured as part of server 110 and interconnected to processor 112. RAM 114, the one or more input-output devices 116 and the non-volatile memory 120 via the common bus; or be configured in an area of non-volatile memory 120 of the server 110.

The access device 150, according to one embodiment, is a computing device comprising: a touch-sensitive graphical user interface ("GUI") 154, a digital signal processor ("DSP") 152 having an access application module that allows a user to access the server 110, access application module 152A, transient and persistent storage devices (not shown); an input/output subsystem (not shown); and a bus to provide a communications path between components comprising the general purpose or special purpose computer (not shown). According to one embodiment, access application module 152A is web-based and uses thin client applications (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX® and APPLE® SAFARI®. According to another embodiment, access device 150 is a mobile electronic device having a GUI, a DSP having an access application module, internal and external storage components; a power management system; an audio component; audio input/output components; an image capture and process system; RF antenna; and a subscriber identification module (SIM) (not shown). Although system 100 is described generally herein as comprising a single access device 150, it should be appreciated that the present invention is not limited to solely two access devices. Indeed, system 100 can include multiple access devices.

The knowledge server 160, according to one embodiment, includes a processor, such as a central processing unit ("CPU"), random access memory ("RAM"), one or more input-output devices, such as a display device and keyboard, non-volatile memory, all of which are interconnected via a common bus and controlled by the processor. The knowledge server 160 further includes a knowledge data store 162, which is a repository that maintains and stores information utilized by the before-mentioned modules 122 through 128. In one embodiment, the knowledge data store 162 is a relational database. In another embodiment, the knowledge data store 162 is a directory server, such as a Lightweight Directory Access Protocol ("LDAP"). In yet another embodiment, the knowledge data store 162 is an area of non-volatile memory 120 of the server device 110. In another embodiment, the knowledge data store 162 is an area of the data store 130 of the server device 110.

According to one embodiment, the knowledge data store 162 maintains a Knowledge Graph or Knowledge Base that is organized as a graph or via tables in a relational database. Various kinds of technologies ranging from Remote Device Management (RDM), such as SQL, to NoSQL such as Cassandra, and to search engine index building tools such as Elastic Search, can be used in order to give fast access to the data to be queried.

Although the knowledge data store 162 shown in FIG. 1 is connected to the network 140, it will be appreciated by one skilled in the art that the knowledge data store 162 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor.

Figure 2:
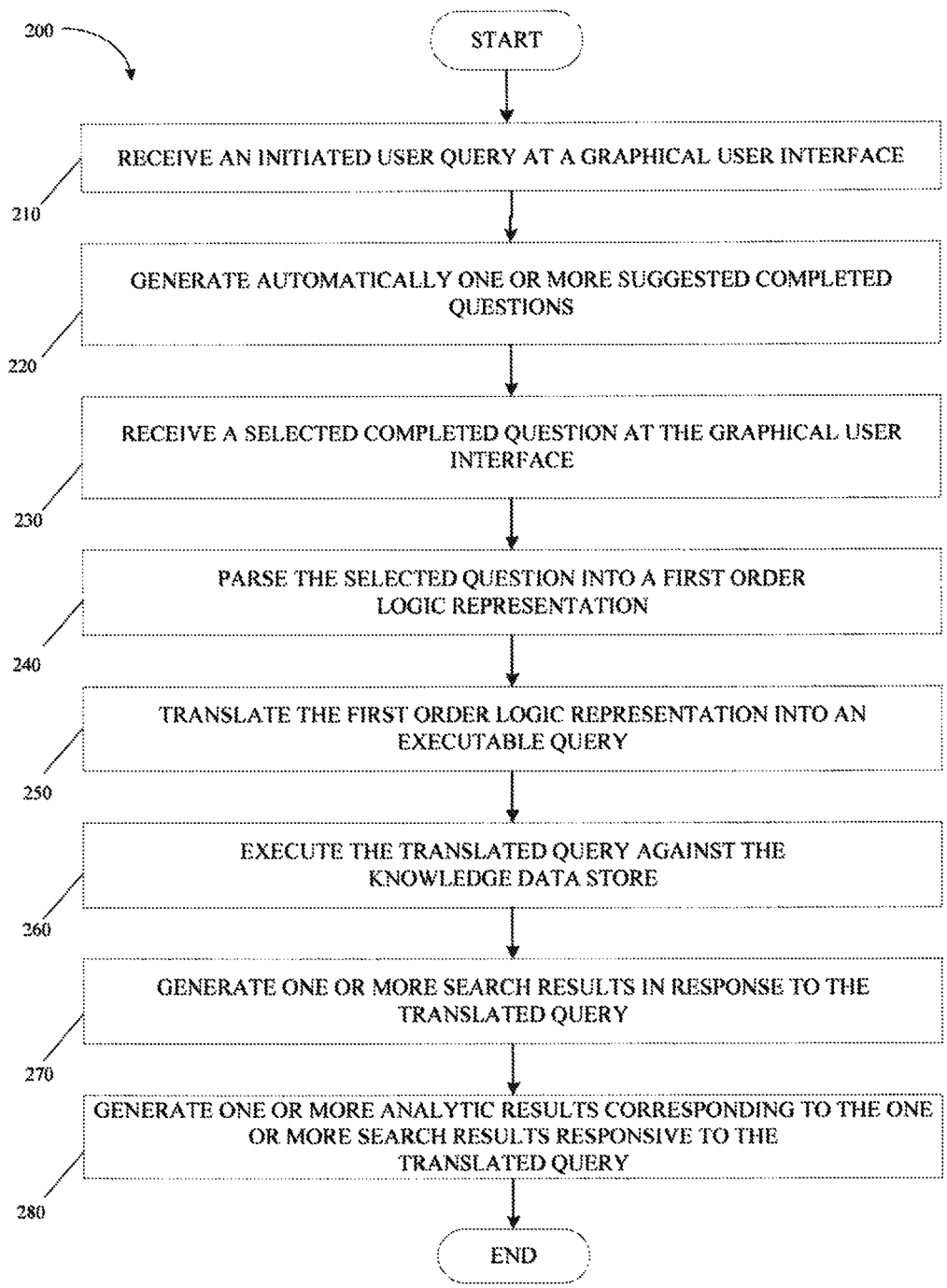
FIG. 2 is a flow diagram illustrating an exemplary computer-implemented method for querying a knowledge base using a flexible natural language interface.

Turning now to FIG. 2, an exemplary method 200 for querying knowledge base using a flexible natural language interface is disclosed in the context of system 100 of FIG. 1.

The exemplary method begins with the receipt of an initiated user question at the graphical user interface 154 of the access device 150, step 210. For example, a user is provided a graphical user interface, such as the shown in FIG. 5A, that provides a field for the user to enter a question. In one embodiment, the user enters the question in natural language format. For example, a user may enter the question "drugs developed by."

Once entered, the question initiated by the user is submitted to query module 124 over the network 140. The query module 124, upon receipt of the initiated user question, signals the auto suggest module 122 to automatically generate one or more suggestions for building complete questions, step 220. According to one embodiment, the query auto suggestion is based upon a defined grammar and the linguistic constraints encoded in the grammar, which is maintained in the suggestions data store 132. For example, the query segment "Drugs", according to defined grammar rules, requires that a verb follows, which we may include any verb from "drive" to "utilizing", that satisfies the grammatical constraints, i.e., they are all verbs. However, in one embodiment, the present invention includes linguistic feature constraints in the defined grammar. For example, only "developed by" and "utilizing" can be suggested as the potential next segment of the query, since the linguistic feature constraints in the defined grammar specifies that only the preceding nouns of "developed by" and "utilizing" can be drugs. Additional details discussing the method to generate suggested completed questions are discussed in conjunction with FIG. 3.

Referring back to the illustrated embodiment shown in FIG. 2, the one or more suggested completed questions are presented on the user interface 154 of the access device 150. Referring to FIGS. 5B and 5C, after typing the question "show me all drugs," different relations to other concepts are suggested, such as "developed by" (a drug to a company) or "having an indication of" (a drug to a disease). According to one embodiment, the auto suggestion can continue on an iterative basis. For example, FIG. 5D illustrates after a user having selected the suggested question component "having an indication of", the auto suggest module 122 subsequently suggests a list of different diseases in order to build completed questions.

Subsequently, a user will select a completed question, which is received at the user interface 154 of the access device 150, step 230. At step 240, the selected question is parsed into a logic representation. The advantage of having an intermediate logical representation is that it enables us to develop different translators to further translate the logic of a question into other executable query formats, such as SQL and SPARQL.

Figure 6:
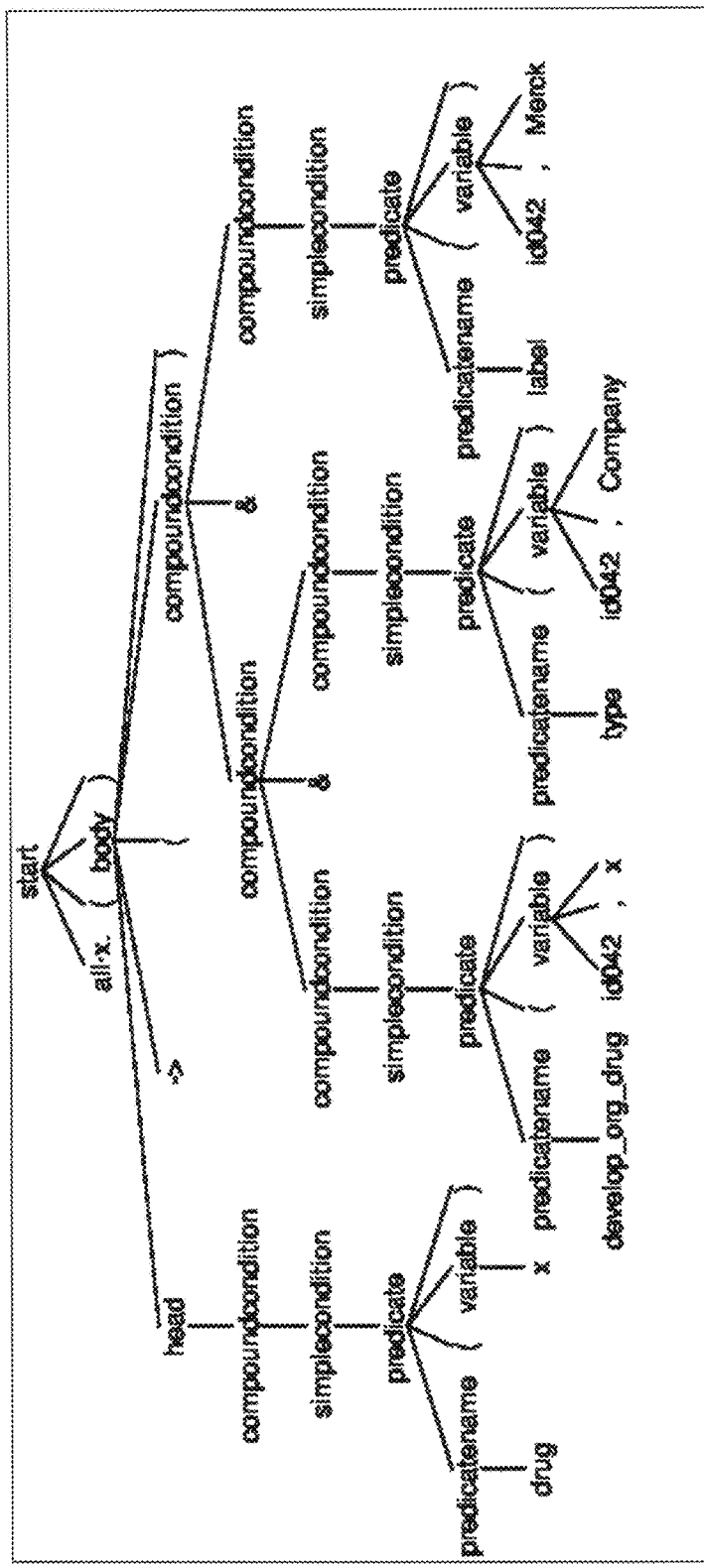
FIG. 6 is an exemplary first order logic parse tree.

According to one embodiment, in order to translate the logic representation to an executable query, a second grammar is developed that first parses logic to a parse tree. FIG. 6 shows the parse tree of the logic for the query "Drugs developed by Merck". Additional details discussing the method to generate suggested completed questions are discussed in conjunction with FIG. 4.

Returning to FIG. 2, the logic representation is then translated into an executable query by the translation module 126, step 250. In one embodiment, the logic parse tree is generated by the translation module 126, which has parsing generator capabilities, and stored in query translation data store 134. The translation module 126 further traverses the logic parse tree, according to one embodiment, in a top-down and left-right manner through which all atomic logical conditions and logical connectors are placed into a stack and are subsequently used to generate the appropriate query constraints and map the predicates in the logic to corresponding attribute names, such as those set forth in the query language commonly known as SQL, or ontology properties, such as those found in SPARQL. Table 1 below illustrates the translated first order logic and subsequent SQL and SPARQL queries corresponding to the natural language query "Drugs developed by Merck."

TABLE 1

Natural Language: "Drugs developed by Merck"

First Order Logic (FOL) Representation: all x.(drug(x)⇒
   (develop_org_drug(id042,x) &
   type(id042,Company) &
   label(id042,Merck)))
SQL Query: select drug.* from drug
   where drug.originator_company_name =
   'Merck'
SPARQL Query:
   PREFIX rdf: <http://www.w3.org/1999/02/
   22-rdf-syntax-ns#>
   PREFIX rdfs: <http://www.w3.org/2000/01/
   rdf-schema#>
   PREFIX example: <http://www.example.com#>
   select ?x ?id123 ?id042
   where
   {
   ?id042 rdfs:label 'Merck'.
   ?id042 rdf:type tr:Company .
   ?x rdf:type example:Drug .
   ?id042 example:develops ?x .
   }

At step 260, the translated query is then executed against the knowledge data store 162 of the knowledge server 160. As discussed in connection with FIG. 1, the knowledge data store 162 is knowledge base environment as in known in the art. In one embodiment, the knowledge data store 162 comprises a relational database, such as an in-memory relational database such as APACHE SPARK™, or a traditional relational database such as Microsoft SQL Server, where relational tables for such topics as Legal, Drug, Company, Patent, Drug Sales, and Drug Estimated Sales are maintained.

Figure 7:
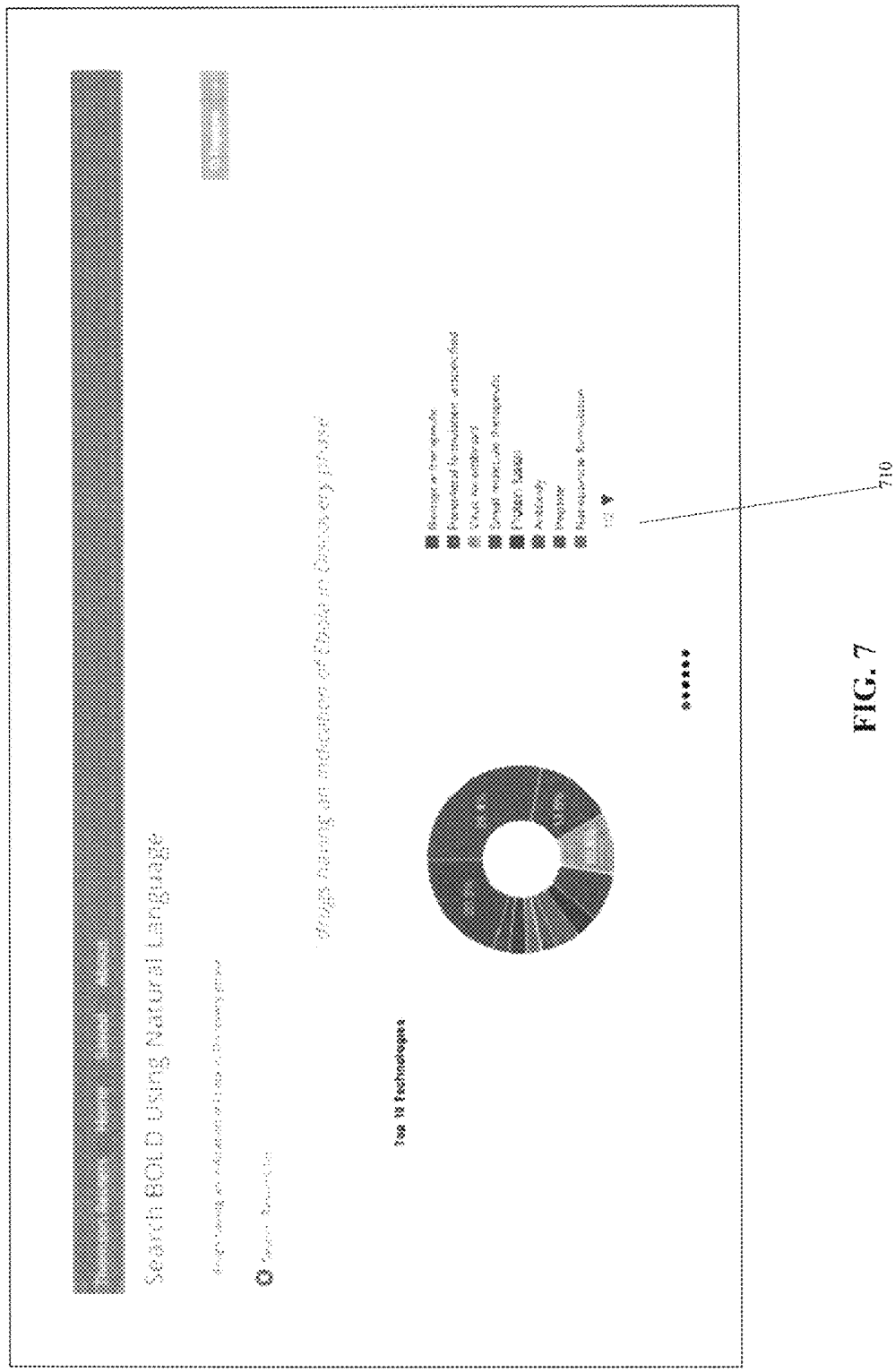
FIG. 7 is a screen diagram of an exemplary graphical representation of the generated search results and the corresponding generated analytics.

One or more search results are then generated in response to the translated query, step 270. For example, as illustrated in FIG. 7, in response to the selected question, "drugs having an indication of Ebola in Discovery Phase" ultimately yields the result set 710.

Figure 8:
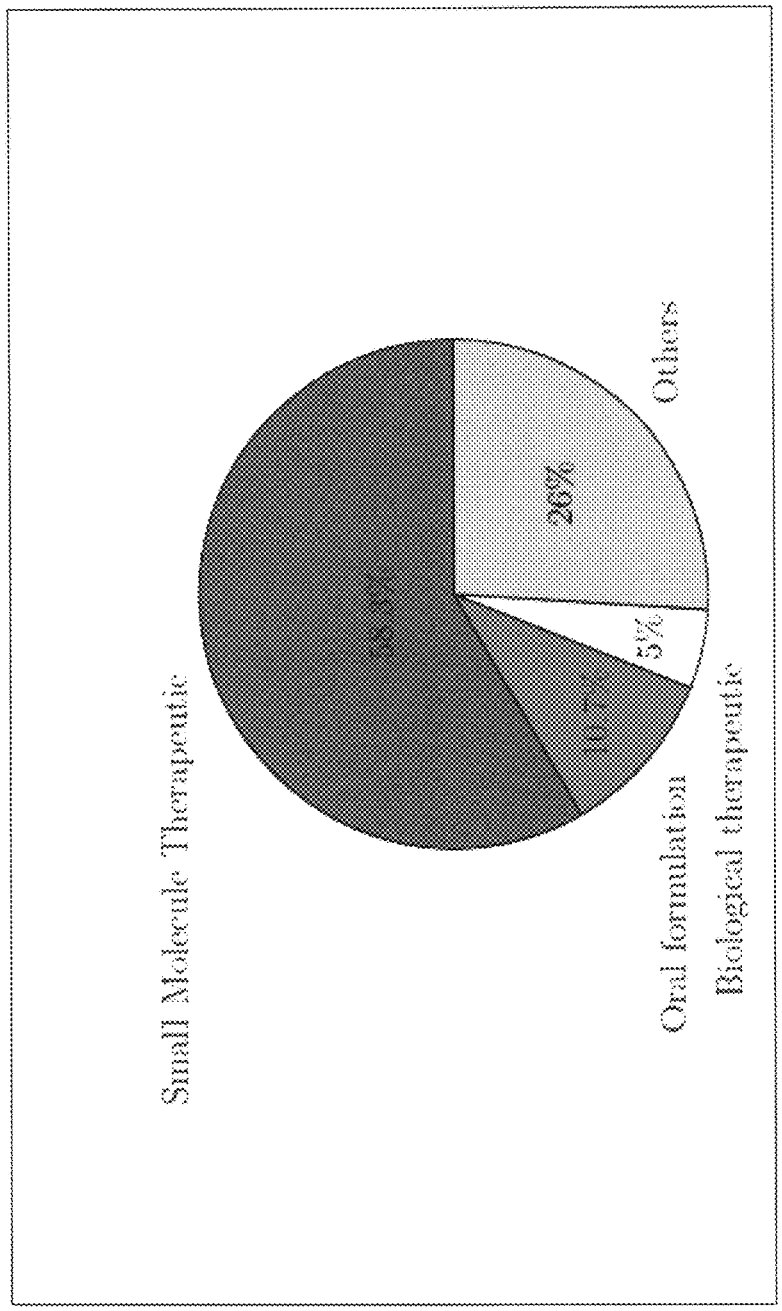
FIG. 8 is a screen diagram of an exemplary graphical representation of the generated descriptive analytics corresponding to the generated search results.

At step 280, one or more analytical results corresponding to the one or more search results of the translated query are generated by the analytics module 128 and stored in the results data store 136, and subsequently presented over the network 140 on the access device 150. According to one embodiment, the analytics generated comprises descriptive analytics that are intended to summarize and present the facts in the result set with some visualization techniques, such as pie chart. This type of analytics does not require any further or deep processing of the actual contents of the resulting records. FIG. 8 illustrates an exemplary result chart, for the question "Drugs targeting pain," which presents a distribution of all techniques used for such drugs in the result set of this natural language question.

Figure 9:
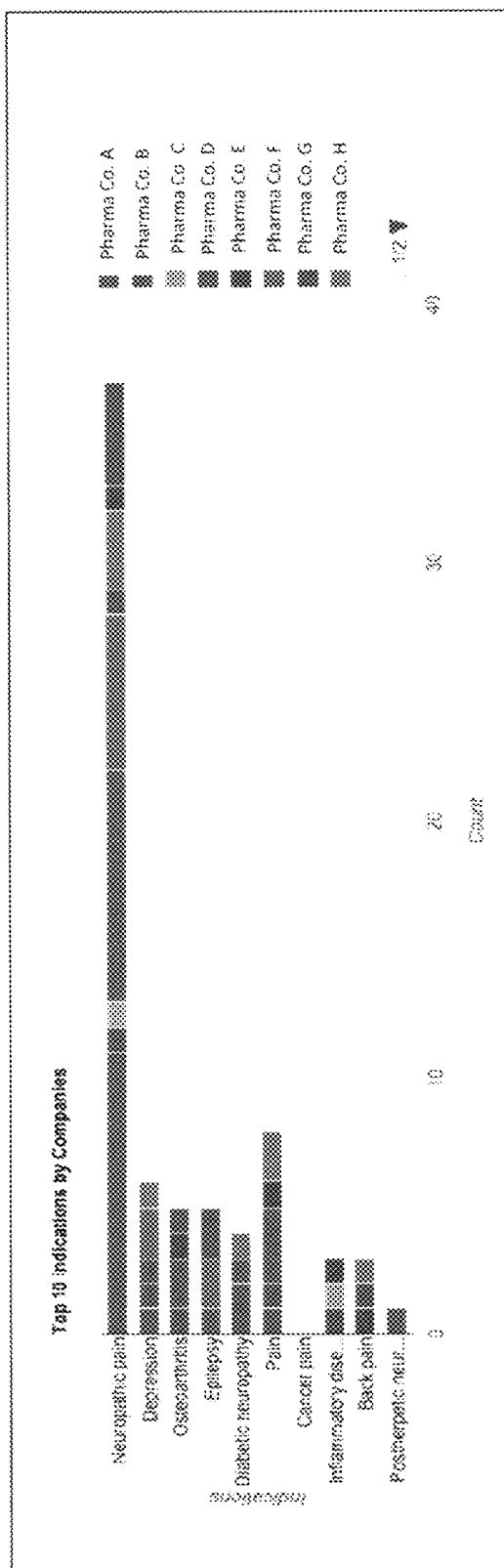
FIG. 9 is a screen diagram of an exemplary graphical representation of the generated comparative analytics corresponding to the generated search results.

According to another embodiment, the analytics generated comprises comparative analytics that compares results on different dimensions, such disease indication for drug topic results or technology area for intellectual property topic results. Referring to FIG. 9, comparative analytics are presented which illustrate pharmaceutical drug companies in a result set being compared an indication of the drugs. For example, FIG. 9 illustrates that among all drugs that target pain. Neuropathic pain is the one that draws the most interests from the companies; moreover, for all companies that develop drugs for Neuropathic pain, Pharma Co. A has the most number of drugs.

Figure 10:
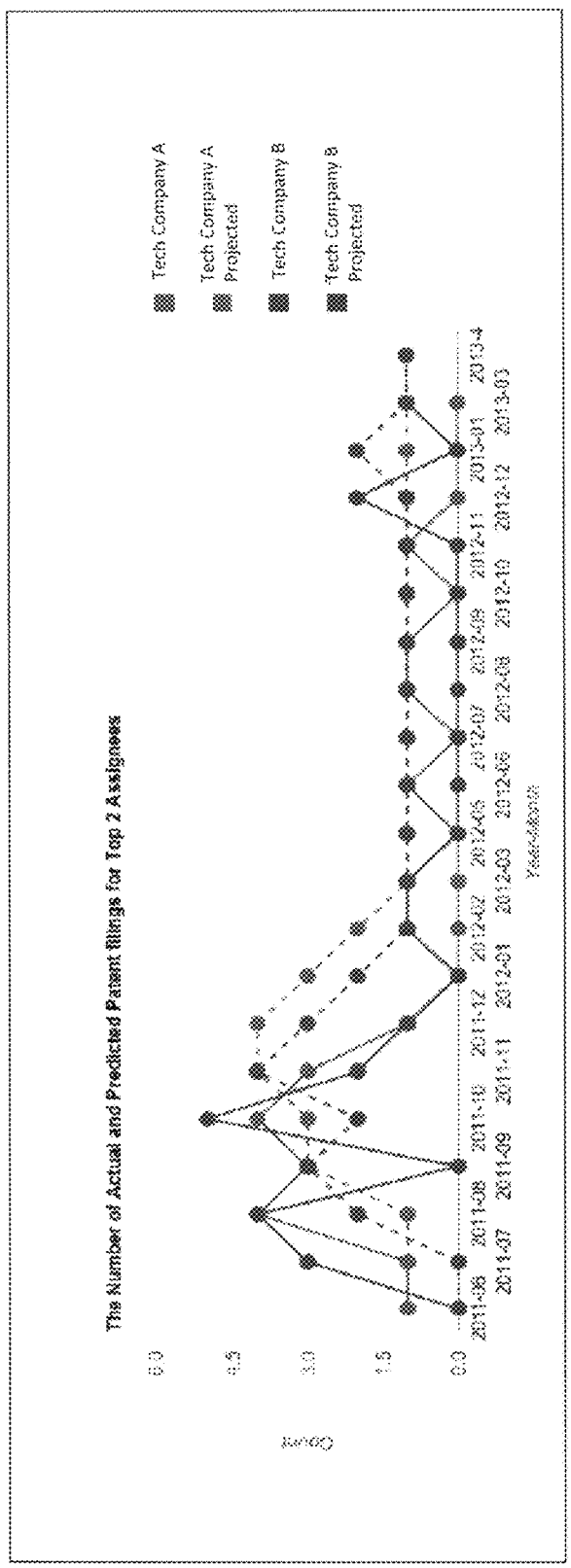
FIG. 10 is a screen diagram of an exemplary graphical representation of the generated temporal analytics corresponding to the generated search results.
Figure 11:
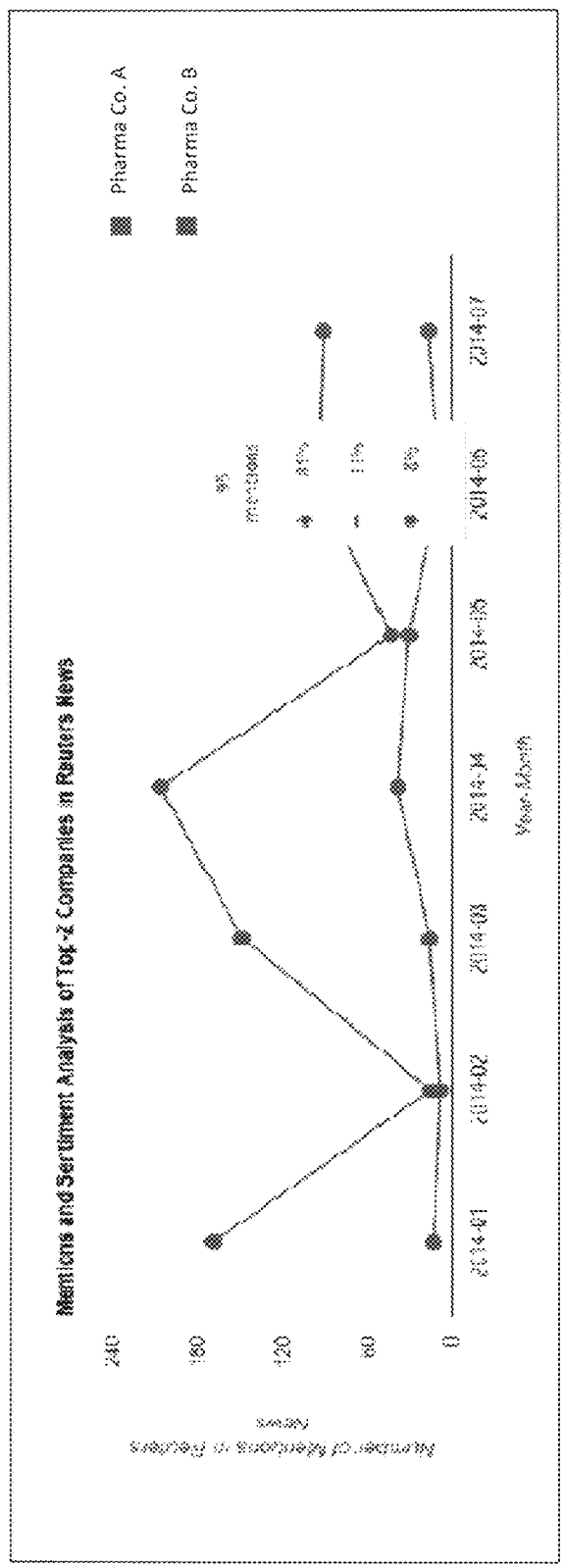
FIG. 11 is a screen diagram of an exemplary graphical representation of the generated content-based analytics corresponding to the generated search results.

According to yet another embodiment, temporal analytics can be developed based on the returned result. For example, for the question "Patents filed by companies headquartered in Germany". FIG. 10 illustrates the predicted trend of patent filing for the top two companies that filed the most patents in the result set using exponential smoothing based on historical and current data points. In yet another embodiment, content-based analytics can be developed based on the returned result, which is performed using two types of text processing: (i) named entity recognition and sentiment analysis. FIG. 11 illustrates a sentiment analysis results for the query "Companies developing drugs having an indication of Hypertension," wherein the top two companies that are most frequently mentioned in a news database, such as the REUTERS News Archive, are presented along with a negative or positive sentiment quantification. For example, when hovering over a data point, the system displays the sentiment results, which for the month of June 2014, shows that there are 85 news articles that mention "Pharma Co. B" and 81% of such documents demonstrate a positive sentiment for the company. It should be noted that the present invention is not limited to any specific embodiment of analytics type and can comprise any combination of content-based analytics, temporal analytics, comparative analytics, descriptive analytics or any other analytic type as is known in the art.

Figure 3:
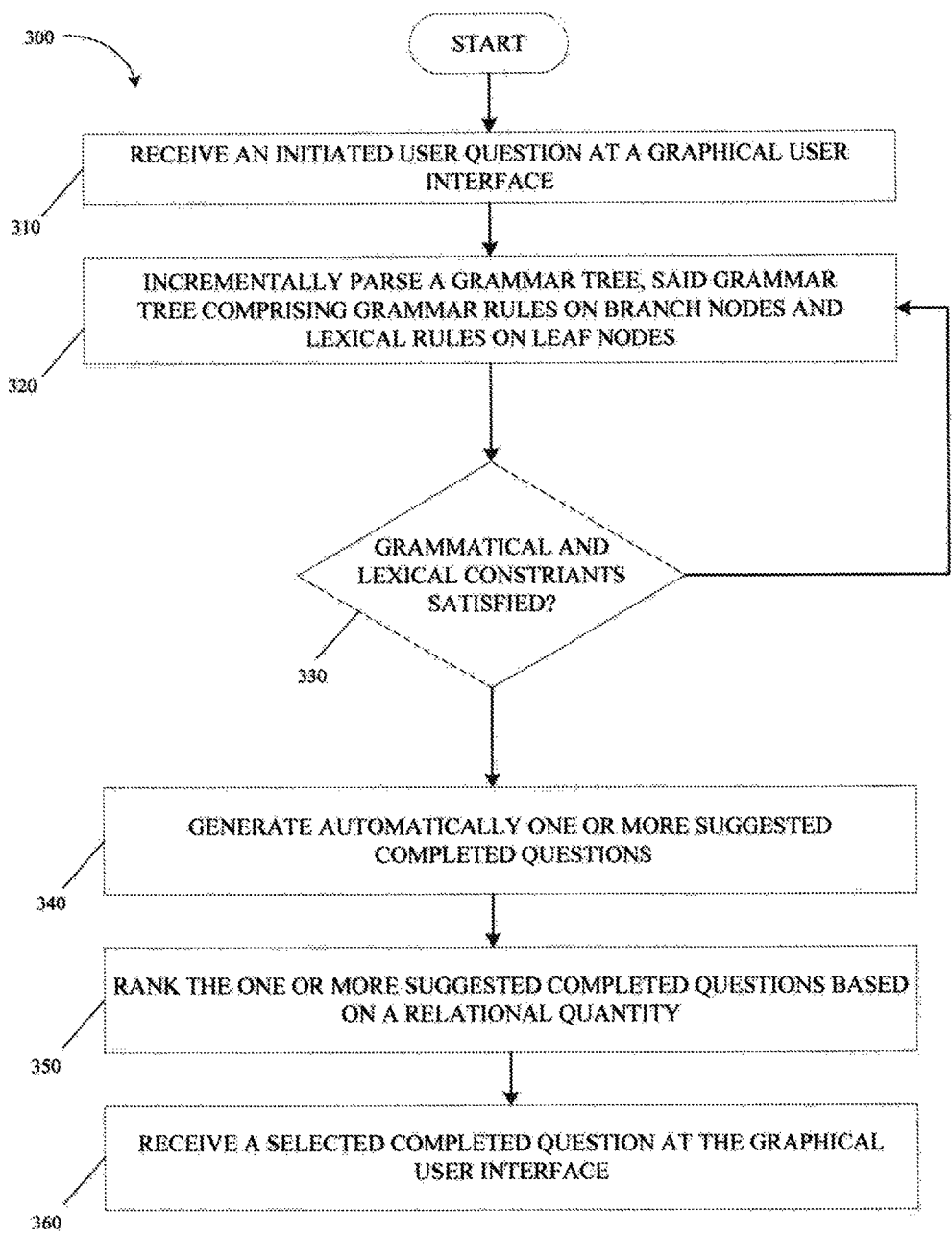
FIG. 3 is a flow diagram illustrating an exemplary computer-implemented method for providing a flexible natural language interface with auto suggestion capability.

Turning now to FIG. 3, a flow diagram illustrating an exemplary computer-implemented method for providing a flexible natural language interface with auto suggestion capability is provided. The exemplary method begins with the receipt of an initiated user question at the graphical user interface 154 of the access device 150, step 310.

Once entered, the question initiated by the user is submitted to query module 124 over the network 140. The query module 124, upon receipt of the initiated user question, signals the auto suggest module 122 to begin the auto suggest process. At step 320, a grammar tree comprising grammar rules on branch nodes and lexical rules on leaf nodes is parsed by the auto suggest module 122. In one embodiment, this is performed incrementally. In another embodiment this process is performed previously in a pre-computational wherein such parsing is performed for all potential variations and stored in the suggestion data store 132.

According to one embodiment, grammatical entries on non-terminal syntactic nodes of the grammar tree are largely domain-independent with each lexical entry to the grammar containing a variety of domain-specific features which are used to constrain the number of parses computed by the parser preferably to a single, unambiguous parse. For example, nouns (N) consist of a type (type) indicating the semantic role of the noun in the phrase, number (num) (singular or plural), and a semantic representation (sem) written using λ-calculus notation. Referring to Table 2, in (1), we see a lexical entry for the word drugs indicating that it is of type drug, is plural, and has semantics represented by $\lambda x.\text{drug}(x)$. Verbs (V) consist of tense (tns) in addition to the type, num, and sem features found in nouns, as shown in (3) of Table 2. The type for verbs can be more complex, specifying both the potential subject-type and object-type roles for a given verb. By utilizing such constraints, the query component "companies developing drugs" will be generated while rejecting nonsensical queries like "rabbits develop drugs" on the basis of the mismatch in semantic type.

TABLE 2

1. N[TYPE=drug, NUM=pl. SEM=<λx.drug(x)>] → 'drugs'
2. N[TYPE=org, NUM=pl, SEM=<λx.drug(x)>] → 'companies'
3. V[TYPE=[org,drug], SEM=<λX x.X(λy.develop_org_drug(x.y))>, TNS=prog, NUM=?n] → 'developing'

Further the grammar tree includes prepositional phrases (PPs) with features that determine their attachment preference. For example, the prepositional phrase "for pain" must attach to a noun and not a verb; so it cannot attach to "develop" but must attach to "drugs". Further features constrain the type of the nominal head of the PP and the semantic relationship that the PP must have with the phrase to which it attaches. Such an approach filters out many of the logically possible but undesired PP-attachments in long queries with multiple modifiers, such as "companies headquartered in Germany developing drugs for pain or cancer."

A determination is then made as to whether the grammatical and lexical constraints are satisfied, step 330. For example, consider the example where a user types in the search term "drugs". Once received, the auto suggest module 122 incrementally parses or traverses the grammar tree to first identify that a verb should appear after the submitted noun query "drugs" and next, that the linguistic constraints define the list of verbs that should be attached to the noun "drugs".

The following Algorithms 1 through 3 present the exemplary pseudo-code that defines the auto-suggestion methodology.

Algorithm 1 Find-Suggestion(grammar, segment). grammar contains all grammar rules and the entire lexicon; and segment is the last query segment based on which the system will find suggestions (e.g., "drugs", "developed by". etc.); returns a list of suggestions

```
1:  suggestions ← ∅
2:
3:  lexicon_left_set ← matching_lexicon_right(grammar,segment)
4:  If lexicon_left_set = ∅ then
5:      return suggestions;
6:  for all grammar_right ∈ lexicon_left_set do
7:
8:      starts ← traverse_up(grammar,grammar_right)
9:      suggestions ← suggestions ∪ traverse_down(grammar.starts)
10: return suggestions
```

Algorithm 2 traverse_up(grammar, grammar_right), grammar contains all grammar rules and the entire lexicon; and grammar_right is used to match against the left corner of right side of the grammar rules; returns a list of starting points for traversing down the grammar tree, i.e., the second component after the matching left corner.

```
1:  starts ← ∅
2:  lefts ← get_grammar_left(grammar,grammar_right)
3:  if lefts = ∅ then
4:      return starts;
5:
6:  for all left ∈ lefts do
7:      second_elements ← get_grammar_second_element(grammar,left)
8:      for all element ∈ second_elements do
9:          if satisfy_linguistic_constraints(element) then
10:             starts ← starts ∪ element
11:         starts ← starts ∪ traverse_up(grammar,left)
12:
13: return starts
```

Algorithm 3 traverse_down(grammar, grammar_lefts), grammar contains all grammar rules and the entire lexicon; and grammar_lefts is a set of the left side of a grammar rule or lexical entry; returns the right side of all lexical entries whose left side can be reached from any given grammar_left

```
1:  suggestions ← ∅
2:
3:  for all left ∈ grammar_lefts do
4:      rights ← get_grammar_right(grammar,left)
5:      suggestions ← suggestions ∪ traverse_down(grammar.rights)
6:      for all right ∈ rights do
7:          if matches_lexical_left(grammar,right) and satisfy_linguistic_constraints(right) then
8:              suggestions ← suggestions ∪ right
9:
10: return    suggestions
```

Referring to Algorithm 1, given a query segment qs (e.g., "drugs", "developed by", etc.), an attempt is made to match it to the right side of all lexical entries and obtain the left sides of all matching lexical entries (Line 3 of Algorithm 1). From Line 6 of Algorithm 1, for each such left side ll, the grammar tree is traversed up (the subroutine in Algorithm 2) and all grammar rules are located whose first element fe on the right side matches ll Second elements, se, of the right side of such matching grammar rules are then obtained. Please note that at Line 11 of Algorithm 2, the search is not limited to the lowest level of grammar rules whose first element on the right side matches the given lexical entry; instead, traversal up to the top level of the grammar tree is always attempted in order to obtain the complete set of suggestions. For se that satisfies certain linguistic constraints (Line 9 of Algorithm 2), the grammar tree is traversed down to find all leaf nodes (Algorithm 3). When traversing down the grammar tree, for each se, the system finds the grammar rules with se on the left side and the first element fe' is obtained from the right side of such rules (Line 4 of Algorithm 3). The fe' is then used to search for leaf nodes recursively (Line 5 of Algorithm 3). Also, for each se, a check can be made to see if it matches the left side of any lexical entry, i.e., if it has already reached a leaf node of a grammar: moreover, if a matching lexical entry also satisfies all the linguistic constraints, this lexical entry is included as one suggestion to the user (Line 6 to 8 of Algorithm 3).

Returning to FIG. 3, once a determination is made that the grammatical and lexical constraints are satisfied, one or more suggestions are automatically generated by the auto suggest module 122, step 340. Alternatively, if the grammatical and lexical constraints are not satisfied, process flow returns to step 320, wherein the grammar tree continues to be incrementally parsed until the applicable grammatical and lexical constraints are satisfied.

The auto suggest module 122 will then rank the one or more automatically generated suggestions based on a relational quantity, step 350. According to one embodiment, the suggestions are ranked by considering their popularity, wherein each lexical entry is treated as a node in a graph of all nodes, including entities (e.g., specific drugs/companies/patents), predicates (e.g., "developed by" and "filed by") and generic types (including Drug, Company. Technology, etc.). The popularity of a node is defined as how many times this entity is related to other nodes in the graph. For example, if the company "X Technology" filed ten patents and is also involved in twenty lawsuits, then the popularity of this "X Technology" node will be thirty. In other embodiment, the suggestions are ranked by user preferences, topical trends, or other known ranking factors as are used in the art, including any combination of the aforementioned ranking factors.

The one or more automatically generated suggested completed questions are then presented on the user interface 154 of the access device 150. Subsequently, a user will select one of the suggested completed questions, which is received at the user interface 154 of the access device 150, step 360.

Figure 4:
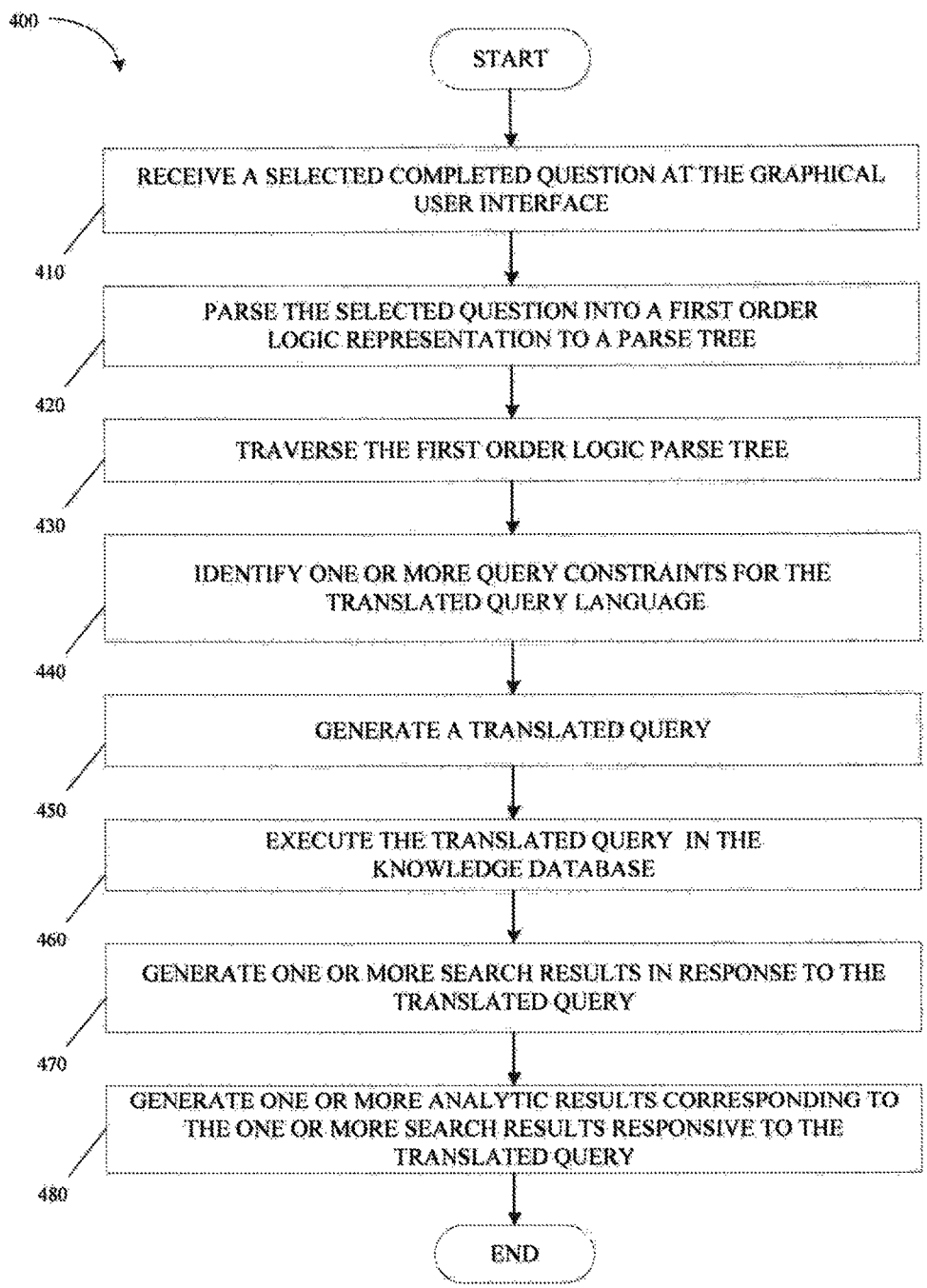
FIG. 4 is a flow diagram illustrating an exemplary computer-implemented method for querying a knowledge base using a flexible natural language interface.
Figure 5A:
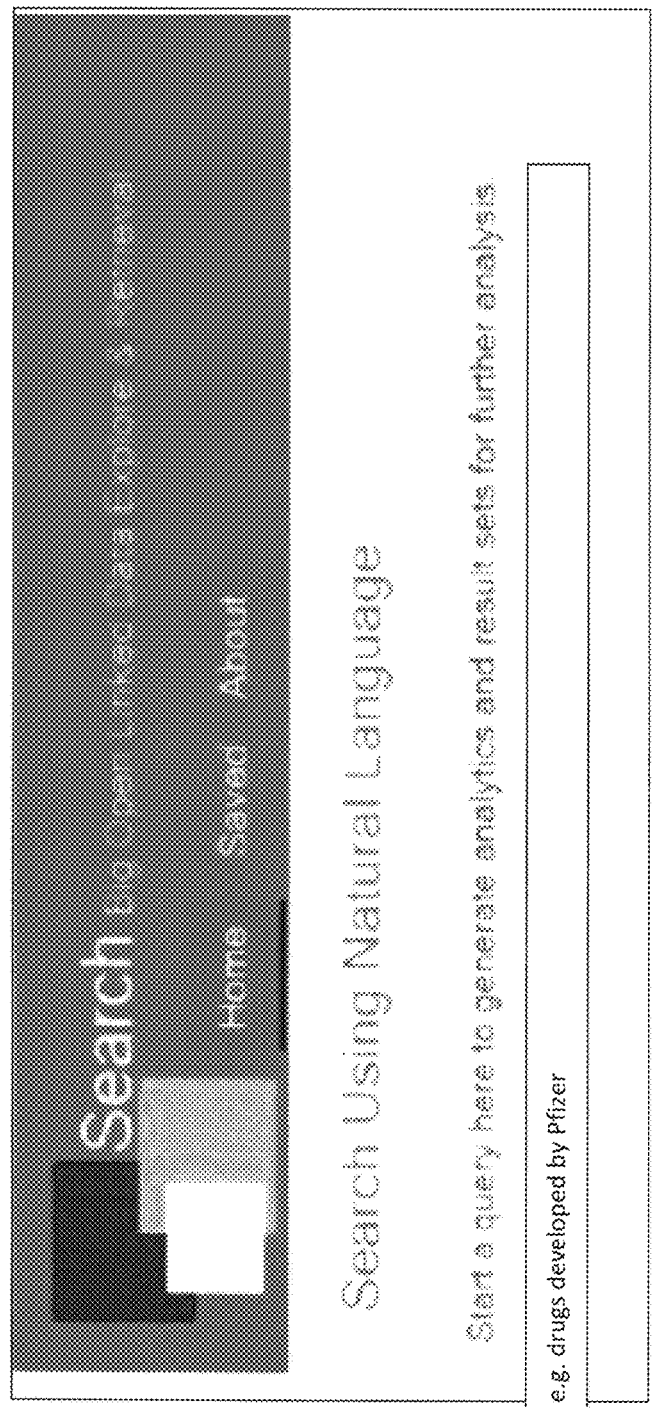

Turning now to FIG. 4, a flow diagram illustrating an exemplary computer-implemented method for querying knowledge base using a flexible natural language interface. The exemplary method begins with the receipt of a selected completed question at the graphical user interface 154 of the access device 150, step 410. The selected completed question is subsequently transmitted to the query module 124 over the network 140. The query module 124, upon receipt of the selected completed question, and then signals the translation module 126, which in turn parses it to a logic representation, which is further translated to a parse tree, step 420. In order to translate the logic representation, translation rules are created. The following is an exemplary set of parsing rules.

start
: 'all x.' '('body')'
|'exists x.' '('body')'
;

In a grammar, there is a starting point, represented by the word "start". The logic parser starts from the starting point and scans the entire logic representation to look for rules that match the rest of the representation.

body
: head
'=>'
('(')?
(quantifier '('body')' (Logicalconnector)?
|
compoundcondition (Logicalconnector)?)*
(')')?
In this rule, it encodes that a "body" consists of a "head" and what is implied from the "head". Question mark ("?") means that what is the preceding parenthesis is optional; while asterisk ("*") indicates that what is the preceding parenthesis can be repeated unlimitedly.
head
: compoundcondition
|
'('(head)'-=>'quantifier '('compoundcondition')'')'
This rule is to show that "head" could be a "compound condition" or be even more complicated (implying itself, i.e., having recursion).
compoundcondition
: simplecondition
|
compoundcondition Logicalconnector compoundcondition Finally, we introduce the "compoundcondition' rule. In general, a compound condition can simply be a simple condition or it can be a sequence of both compound and simple conditions. Conditions in the sequence are connected by logical connectors, including $\wedge$ and $\vee$. This rule enables us to parse logic representations with complex logical conditions. The logic parsing grammar rules are written using the ANTLR environment.

With the help of this logic parsing grammar, the parse tree of the logic parsing representation of the query "Drugs developed by Merck" in the above example is shown in FIG. 6. In the parse tree, we can see that the predicates and variables in the first order logic, e.g., "drug", "develop_org_drug", "id042", etc., are the leaf nodes in the tree.

At step 430, the logic parse tree is traversed and one or more query constraints maintained in the query translation data store 134 are identified tbr the translated query language, step 440. As discussed in connection with FIG. 2, the translation module 126 traverses the logic parse tree, according to one embodiment, in a top-down and left-right manner through which all atomic logical conditions and logical connectors are placed into a stack and are subsequently used to generate the appropriate query constraints and map the predicates in the logic to corresponding attribute names, such as those set forth in the query language commonly known as SQL, or ontology properties, such as those found in SPARQL.

At step 450, a translated query is generated by the translation module 126. According to one embodiment, several tables are designed where their data gets loaded into in the knowledge data store 162 for the following topics: Legal, Drug, Company, Patent, Drug Sales, and Drug Estimated Sales. Table 3 presents a general description of these different tables, which are derived from both pay for and public sources. In practice, the predicate "develop_org_drug" identified when traversing FIG. 6 will be mapped to the "originator company" attribute in the "drug" table. The "label" predicate is used to build the value constraint, e.g., replacing the variable "id042" with the actual value "Merck" in this specific example.

TABLE 3

| Table | Major Attributes | Sample Query |
|---|---|---|
| Drug | ID, Name, Originator Actions, Indications Technologies, Status | Drugs developed by Merck targeting lung cancer |
| Company | ID, Name, Country | Show me German companies developing drugs targeting cancer or pain |
| Patent | Country, Assignee Application Date Expiration Date | Patents granted in United States in 2011 |
| Drug Sales | Drug ID, Drug Name Company Name Sale Value, Sale Year | 2013 sales for drugs developed by Merck targeting hypertension |
| Drug Estimates | Drug ID, Drug Name Company Name Value, Year | 2015 estimates for drugs developed by Pfizer targeting pain |

At step 460, the query module 124 executes the translated query to the knowledge data store 162 of the knowledge server 160. One or more search results responsive to the translated query are generated and stored in the results data store 136, step 470. At step 480, one or more analytical results corresponding to the one or more search results responsive to the translated query are generated by the analytics module 128.

FIGS. 1 through 11 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like): a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is fir the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not as limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method for querying a data repository using a flexible natural language interface comprising: receiving an initiated user question at a graphical user interface; generating automatically one or more suggested completed questions in response to the receipt of the initiated user question, said generation based on a defined grammar and linguistic constraints associated with the defined grammar, wherein said generating comprises incrementally parsing a grammar tree, said grammar tree comprising grammar rules relating to the defined grammar on branch nodes and lexical rules relating to the linguistic constraints on leaf nodes; receiving a selected completed question at the graphical user interface; parsing the selected completed question into a logic representation; translating the logic representation into an executable query; executing the translated query against the data repository; generating one or more search results in response to the executed translated query; generating one or more analytic results corresponding to the one or more search results responsive to the executed translated query, wherein said one or more analytic results comprises one or more of a descriptive analytic result, a comparative analytic result, a temporal analytic result and a content-based analytic result; and presenting the one or more search results and the one or more analytic results corresponding to one or more search results at the graphical user interface.

2. Non-transitory computer readable media comprising program code stored thereon for execution by a programmable processor to perform a method for querying a data repository using a flexible natural language interface, the computer readable media comprising: program code for receiving an initiated user question at a graphical user interface; program code for generating automatically one or more suggested completed questions in response to the receipt of the initiated user question, said generation based on a defined grammar and linguistic constraints associated with the defined grammar, wherein said program code for generating comprises program code for incrementally parsing a grammar tree, said grammar tree comprising grammar rules relating to the defined grammar on branch nodes and lexical rules relating to the linguistic constraints on leaf nodes; program code for receiving a selected completed question at the graphical user interface; program code for parsing the selected completed question into a logic representation; program code for translating the logic representation into an executable query; program code for executing the translated query against the data repository; program code for generating one or more search results in response to the executed translated query; program code for generating one or more analytic results corresponding to the one or more search results responsive to the executed translated query, wherein said one or more analytic results comprises one or more of a descriptive analytic result, a comparative analytic result, a temporal analytic result and a content-based analytic result; and program code for presenting the one or more search results and the one or more analytic result corresponding to one or more search results at the graphical user interface.

3. A system for querying a data repository using a flexible natural language interface comprising: a server including a processor configured to: receive an initiated user question at a graphical user interface; generate automatically one or more suggested completed questions in response to the receipt of the initiated user question, said generation based on a defined grammar and linguistic constraints associated with the defined grammar, wherein said generating comprises incrementally parsing a grammar tree, said grammar tree comprising grammar rules relating to the defined grammar on branch nodes and lexical rules relating to the linguistic constraints on leaf nodes; receive a selected completed question at the graphical user interface; parse the selected completed question into a logic representation; translate the logic representation into an executable query; execute the translated query against the data repository; generate one or more search results in response to the executed translated query; generate one or more analytic results corresponding to the one or more search results responsive to the executed translated query, wherein said one or more analytic results comprises one or more of a descriptive analytic result, a comparative analytic result, a temporal analytic result and a content-based analytic result; and present the one or more search results and the one or more analytic results corresponding to one or more search results at the graphical user interface.

4. The computer-implemented method of claim 1 wherein generating automatically one or more suggested completed questions in response to the receipt of the initiated user question further comprises:
upon incrementally parsing the grammar tree, determining whether the grammar rules and linguistic constraints are satisfied;
generating automatically one or more suggested completed questions upon determination that the grammar rules and linguistic constraints are satisfied.

5. The computer-implemented method of claim 1 wherein generating automatically one or more suggested completed questions in response to the receipt of the initiated user question further comprises ranking the one or more suggested completed questions based on a relational quantity.

6. The computer-implemented method of claim 1 wherein parsing the selected question into a logic representation further comprises:
parsing the logic representation to a parse tree; and
traversing the parse tree in order to identify one or more query constraints for the translated query language, said query constraints utilized to generate a translated query.

7. The computer readable media of claim 2 wherein the program code for generating automatically one or more suggested completed questions in response to the receipt of the initiated user question further comprises:
program code for determining whether the grammar rules and linguistic constraints are satisfied upon incrementally parsing the grammar tree; and
program code for generating automatically one or more suggested completed questions upon determination that the grammar rules and linguistic constraints are satisfied.

8. The computer readable media of claim 2 wherein program code for generating automatically one or more suggested completed questions in response to the receipt of the initiated user question further comprises program code for ranking the one or more suggested completed queries based on a relational quantity.

9. The computer readable media of claim 2 wherein program code for parsing the selected question into a logic representation further comprises:
program code for parsing the logic representation to a parse tree; and
program code for traversing the parse tree in order to identify one or more query constraints for the translated query language, said query constraints utilized to generate a translated query.

10. The system of claim 3 wherein in generating automatically one or more suggested completed questions in response to the receipt of the initiated user question, the server is further configured to:
upon incrementally parsing the grammar tree, determine whether the grammar rules and linguistic constraints are satisfied; and
generate automatically one or more suggested completed questions upon determination that the grammar rules and linguistic constraints are satisfied.

11. The system of claim 3 wherein in generating automatically one or more suggested completed questions in response to the receipt of the initiated user question, the server is further configured to rank the one or more suggested completed questions based on a relational quantity.

12. The system of claim 3 wherein in parsing the selected query into a logic representation, the server is further configured to:
parse the logic representation to a parse tree; and
traverse the parse tree in order to identify one or more query constraints for the translated query language, said query constraints utilized to generate a translated query.

* * * * *